Jan. 30, 1968 AKIRA MATSUSHITA 3,366,938

WOVEN MAGNETIC MEMORY HAVING A HIGH DENSITY PERIPHERY

Filed April 1, 1964

INVENTOR.
Akira Matsushita

BY

Mestern & Mestern

United States Patent Office 3,366,938

Patented Jan. 30, 1968

3,366,938

WOVEN MAGNETIC MEMORY HAVING A HIGH DENSITY PERIPHERY

Akira Matsushita, Kitatama-gun, Tokyo-to, Japan, assignor to Kabushiki Kaisha Toko Radio Coil Kenkyusho, Ota-ku, Tokyo-to, Japan, a joint-stock company of Japan Filed Apr. 1, 1964, Ser. No. 356,379
4 Claims. (Cl. 340—174)

ABSTRACT OF THE DISCLOSURE

A magnetic memory device having a network of woven fabric, the wefts consisting of conductors provided with a magnetic coating and the warps of conductors, wherein a peripheral portion of the network has higher density than the inner portion. Spacers may be interwoven with the conductors.

This invention relates to one type of magnetic matrix memory device utilizing wires coated with magnetic material.

Memory networks or matrixes are often fabricated in the form of woven fabrics comprising wefts of conductors each provided with a magnetic coating and warps of conductors. In connecting numerous lead wires to the respective ends of these conductors, the intersections between the conductors are shifted or skewed in the peripheral portion of the fabric so that the magnetic characteristics of the memory network vary greatly at the peripheral portion thereof.

This invention contemplates eliminating this defect by providing a densely woven protective portion around the periphery of the matrix memory network in the form of a woven fabric.

The features of the invention which are believed to be novel are set forth with particularity in the appended claims. The invention itself, however, as to its organization together with further objects and advantages thereof, may best be understood by reference to the following description taken in connection with the accompanying drawings, in which:

Figure 1:
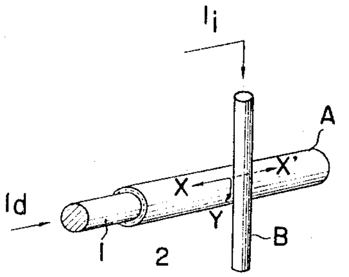
FIG. 1 shows a perspective view of a portion of a matrix memory device illustrating its principle.

Referring now to the accompanying drawings, FIG. 1 shows a portion of a matrix memory device to illustrate its basic principle. The matrix comprises a first conductor A including a core 1 of non-magnetic or paramagnetic material such as copper, molybdenum, and invar and a ferromagnetic film 2 of permalloy, or nickel deposited on the core by plating and a second conductor B disposed at right angles with respect to the coated conductor A. By passing a driving pulse current $I_d$ through one of these conductors and a positive or negative information pulse current $I_i$ through the other conductor (while in FIG. 1 the conductors A and B are shown to carry the driving pulse current $I_d$ and the information pulse current $I_i$, respectively, it is to be noted that the conductor A may carry the pulse current $I_i$ and the conductor B the pulse current $I_d$ depending upon the direction of easy axis of magnetization of the magnetic film 2) to shift the direction of magnetization, thereby to store the information "1" or "0," dependent upon the direction of magnetization. In the case illustrated in FIG. 1, as the easy axis of magnetization extends in the direction of X, the direction of magnetization of the magnetic coating will be shifted in the direction of Y at the instant when the driving pulse current $I_d$ is passed, and this state will be reset in the direction of X or X′ by the information pulse current $I_i$.

To read out the stored memory, the next driving pulse current $I_d$ is passed to shift the direction of magnetization to produce an output pulse in an output conductor extending through the respective intersection (the conductor adapted to carry the information pulse current $I_i$ can also be used for this purpose). As is well known in the art, depending upon whether the output pulse is positive or negative, a memory of either "1" or "0" can be read out.

Figure 2:
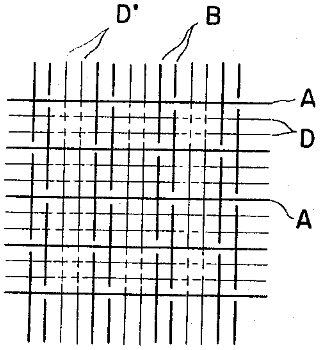
FIG. 2 is a diagramatic representation of a conventional memory matrix.

In order to fabricate a memory circuit by utilizing the above mentioned principle, a number of conductors, A, having magnetic coating are arranged in parallel and spaced apart from each other, and then a number of spaced parallel conductors B are disposed to cross the conductors A at right angles by weaving. It is also possible to weave to form a fabric with wefts consisting of a group of conductors A coated with magnetic film and warps consisting of conductors B while interweaving spacers D and D′, if desired, as shown in FIG. 2. Where the conductors for carrying information pulses are not utilized as output conductors, the output conductors should be disposed in parallel with conductors A or B.

Where the memory network is fabricated by weaving conductors, A, having magnetic coating, conductors B, output conductors, and spacers, in the manner above described, the number of lead wires L for these conductors becomes numerous, and the spacing between adjacent lead wires is very small. Accordingly, in connecting the lead wires to the memory network, it is advantageous to spread out the lead wires to facilitate connection as shown by dot and dash lines in FIG. 3.

However, if the lead wires are spread out in this way to increase the spacing therebetween, the intersections between the conductors A and the conductors B are shifted or become out of order, thereby changing the characteristics of the memory network.

Figure 3:
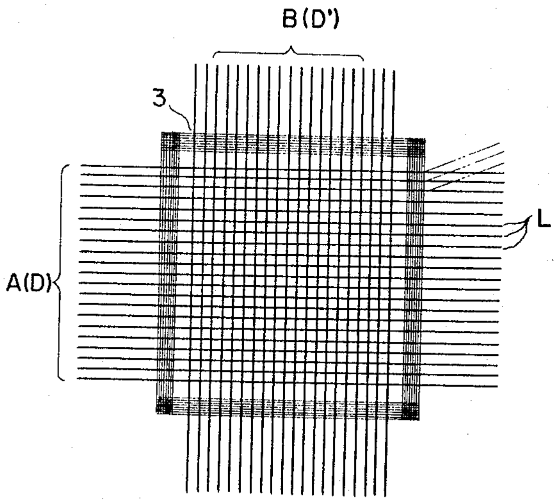
FIG. 3 shows a plan view of a memory device of this invention.

It is the principal object of this invention to obviate such a defect, and in accordance with this invention the edges or peripheral portion 3 of a memory network in the form of a woven fabric comprising wefts consisting of a plurality of parallel conductors A having magnetic coating and warps consisting of a plurality of conductors B (spacers D may be included in either the wefts or the warps, or both) are particularly woven to have dense structure, as shown in FIG. 3. The peripheral portion 3 may be fabricated from flexible fibers such as artificial fibers, chemical fibers, and glass fibers of different diameters or cross sections in order to form a dense fabric, or from the same material as that employed to form the memory network. With this construction the lead wires are bent only outside of the densely woven peripheral portion 3 irrespective of the method of connecting the lead wires L or of the extent of spreading. Thus, the internal portion of the matrix network is well protected by the dense peripheral portion against shift of intersections caused by connecting operation of lead wires, thus preserving the desired characteristics of the matrix network.

While the invention has been explained by describing a particular embodiment thereof, it will be apparent that improvements and modifications may be made without departing from the scope of the invention as defined in the appended claims.

What is claimed is:

1. In a magnetic memory device including a memory network of a woven fabric comprising wefts consisting of a plurality of conductors each provided with a magnetic coating and warps consisting of a plurality of conductors, an improvement wherein said woven fabric is provided with a peripheral woven portion having a density higher than that of the inner portion of said woven fabric.

2. The magnetic memory device according to claim 1 wherein said peripheral portion is made of flexible fibers.

3. The magnetic memory device according to claim 1 wherein said peripheral portion is made of the same material as that comprising the wefts or warps.

4. In a magnetic memory device including a memory network of the form of a woven fabric comprising wefts consisting of a plurality of conductors each provided with a magnetic coating, warps consisting of a plurality of conductors, and spacers interwoven with said conductors, an improvement wherein said woven fabric is provided with a peripheral woven portion having a density higher than that of the inner portion of said woven fabric.

References Cited

UNITED STATES PATENTS

| | | | |
|---|---|---|---|
| 3,300,767 | 1/1967 | Davis et al. ---------- | 340—174 |
| 3,309,681 | 1/1967 | Boles et al. ---------- | 340—174 |

BERNARD KONICK, *Primary Examiner.*

STANLEY M. URYNOWICZ, *Examiner.*